G. SCHWABE.
PICKING DEVICE FOR POWER LOOMS.
APPLICATION FILED OCT. 17, 1914.

1,147,124.

Patented July 20, 1915.

UNITED STATES PATENT OFFICE.

GEORG SCHWABE, OF BIELITZ, AUSTRIA-HUNGARY.

PICKING DEVICE FOR POWER-LOOMS.

1,147,124. Specification of Letters Patent. Patented July 20, 1915.

Application filed October 17, 1914. Serial No. 867,237.

*To all whom it may concern:*

Be it known that I, GEORG SCHWABE, a manufacturer, and a subject of the Emperor of Austria-Hungary and a resident of Bielitz, Austrian Silesia, part of the Austro-Hungarian Empire, have invented a certain new and useful Picking Device for Power-Looms, of which the following is a specification.

In power looms with positive picking movement it is known that the force required to move the picker stick can be reduced by the contraction of stretched helical springs. It is also known to return the picker stick after the throw of the shuttle by means of a tensioned helical spring engaging with the picker stick and swinging with the picking sector.

According to the present invention a separate spring for the latter purpose is done away with and the return of the picker stick is effected by the first mentioned spring.

The arrangement is illustrated in the accompanying drawings, in which—

Figure 1:
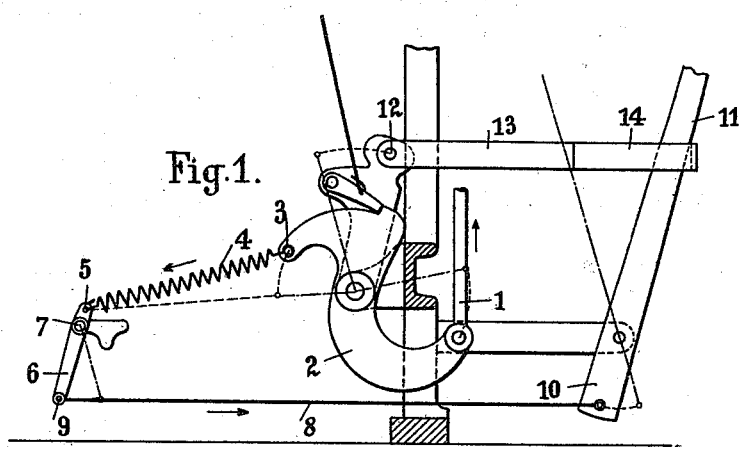
Figure 2:
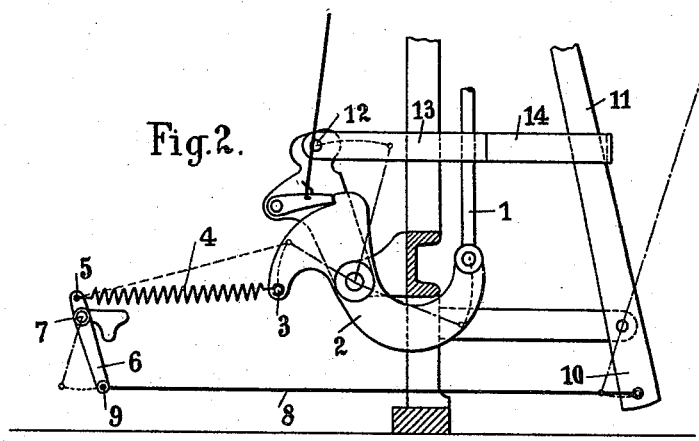

Figure 1 shows the position of the parts before the throw of the shuttle, and Fig. 2 the position after the throw.

The arrangement is as follows:—A helical spring 4 is attached at the point 3 to a curved member 2, which is connected by the rod 1 with the means for effecting the picking movement. The other end of the spring 4 is attached at 5 to the upper arm of a two armed lever 6 pivoted to a fixed cross piece 7, the other arm of which is connected at the point 9 by a wire 8 or the like to an extension 10 of the picker stick 11.

By means of the member 2 which is moved in the direction of the arrow, by the actuating mechanism, the picker stick 11 is set in motion by the lever 12, rod 13 and strap 14, and the upper arm of lever 6 is also moved in the same direction, while the wire 8 and the lower arm of lever 6 are moved in the opposite direction. Since the point of attachment 3 between the member 2 and the spring 4, which is tensioned between member 2 and lever 6, moved through a greater arc than the upper arm of the lever 6, the spring 4 as it moves with the member 2 and picker stick 11 is not further strained, but, on the other hand, the strain is released from the parts sharing the picking movement. The forward movement of the picker stick is taken up through the wire 8 and lever 6 by the spring 4 (Fig. 2). After the throw of the shuttle, the member 2 returns to its normal position, whereby the helical spring 4 is extended and the picker stick returned.

Having now particularly described and ascertained the nature of my said invention, and in what manner the same is to be performed, I declare that what I claim is:—

In a power loom, a picking device comprising an oscillative driving member, a picker stick actuated thereby, a two arm lever, a spring interposed between said member and one arm of said lever, and a wire that connects the other arm of the lever to the picker stick.

GEORG SCHWABE.

Witnesses:
FRIEDRICH RUNGE,
FRIEDRICH SCHWARZ.

Copies of this patent may be obtained for five cents each, by addressing the "Commissioner of Patents, Washington, D. C."